March 4, 1941.  J. MROZIAK  2,233,548
SWITCH BOX SUPPORT
Filed June 20, 1938
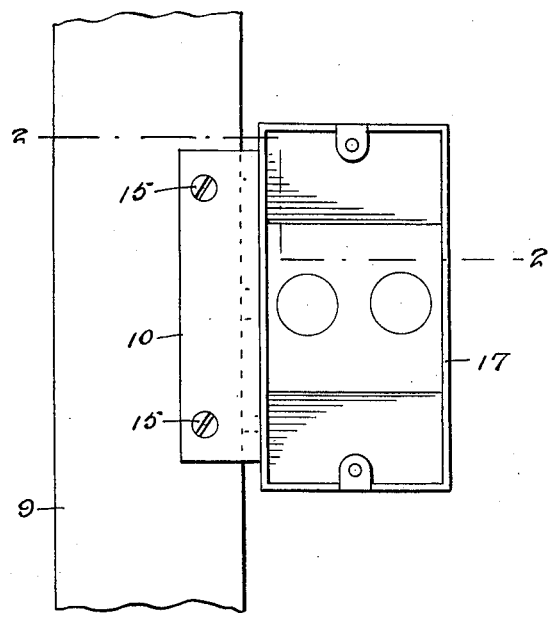
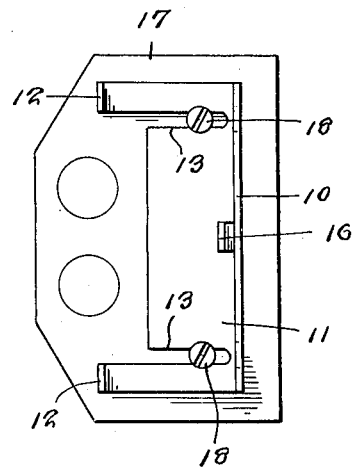
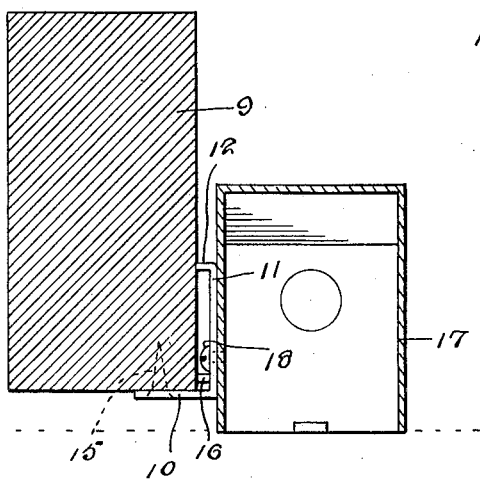
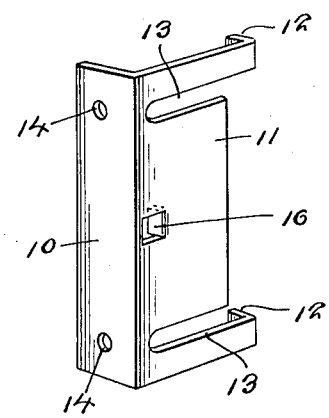
Joseph Mroziak
INVENTOR
BY Victor J. Evans & Co.
ATTORNEYS Patented Mar. 4, 1941

2,233,548

UNITED STATES PATENT OFFICE 2,233,548

SWITCH BOX SUPPORT

Joseph Mroziak, Niagara Falls, N. Y.

Application June 20, 1938, Serial No. 214,802

1 Claim. (Cl. 248—221)

This invention relates to switch box supports and has for an object to provide a support which will afford a quicker and more efficient mounting of outlet boxes or other boxes to 2 x 4 uprights or other columns.

A further object of the invention is to provide a switch box support which will eliminate the use of top and bottom clamps and which may be secured to the upright in minimum time.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a front elevation of the clamp shown in position to mount an outlet box or other box upon a 2 x 4.

Figure 2 is a cross sectional view taken on the line 2—2 of Figure 1.

Figure 3 is a side elevation of the support applied to the box shown in Figure 1.

Figure 4 is a detail perspective view of the support.

Referring now to the drawing in which like characters of reference designate similar parts in the various views, the switch box support comprises an L-shaped bracket formed of sheet metal and including a front relatively narrow portion 10 and a relatively wide rearwardly extending portion 11 formed at the end with spaced lugs 12 which are shorter than the front portion 10 and extend parallel therewith. The wider portion 11 is provided with upper and lower lateral slots 13 which extend across the greater portion of its width. The front portion is provided with spaced openings 14 through which securing screws 15 may be passed to secure the bracket to the face of an upright member 9 such as a 2 x 4 or other joist or column. The wider portion 11 is disposed along the side of the 2 x 4 and as will be seen by referring to Figures 2 and 4, is equipped with a struck out lug 16 disposed near the front portion 10 and intermediate the two lugs 12.

The outlet box 17 or other box is detachably secured to the bracket through the medium of screws 18 carried by the box, which are passed through the slots 13. By sliding the box forward until the screws engage the end walls of the slots the box is locked in place and by sliding the box rearwardly the screws pass out of the open ends of the slots and the box is disengaged from the bracket. The lugs 12 and 16 form a solid support for the wide portion of the bracket while spacing the box slightly from the 2 x 4 or other column to allow for projections which may occur on certain boxes and also to permit the heads of the securing screws to slide freely in the slots 13.

From the above description it will be seen that the bracket may be inexpensively produced from a single stamping of sheet metal and may be quickly applied to the outlet box or other box and to a column of any kind in minimum time.

What is claimed is:

An outlet box support comprising, an angular bracket having a relatively long leg and a relatively short leg extending at a right angle to the long leg, said legs being adapted to engage contiguous faces of a post of rectangular cross section, there being a pair of parallel slots in the long leg opening through the free edge of the leg and adapted to receive securing means of a conventional outlet box slid longitudinally of the slots toward the short leg, spaced lugs projecting from one side of the long leg at the extreme end of the long leg outside of the slots, a lug projecting from the same side of the long leg at the center of the long leg near the short leg, all of said lugs forming spacers located at the apex and base angles of an imaginary triangle and extending at a right angle to said long leg for engagement with a face of the post to space the long leg from the post, and securing means carried by the short leg for securing the bracket to the post.

JOSEPH MROZIAK.